US008549578B2

(12) United States Patent  
Herigstad et al.

(10) Patent No.: US 8,549,578 B2
(45) Date of Patent: *Oct. 1, 2013

(54) VIDEO INTERACTION WITH A MOBILE DEVICE AND A VIDEO DEVICE

(75) Inventors: Dale Herigstad, Hollywood, CA (US); Harry Kargman, New York, NY (US)

(73) Assignee: ACK Ventures Holdings, LLC, Westport, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/771,367

(22) Filed: Apr. 30, 2010

(65) Prior Publication Data

US 2010/0218211 A1    Aug. 26, 2010

Related U.S. Application Data

(63) Continuation of application No. 09/950,321, filed on Sep. 10, 2001, now Pat. No. 7,712,125.

(60) Provisional application No. 60/231,285, filed on Sep. 8, 2000.

(51) Int. Cl.
   *H04N 7/173* (2011.01)

(52) U.S. Cl.
   USPC ............ 725/133; 725/38; 725/109; 725/112; 725/141; 725/153

(58) Field of Classification Search
   USPC .................. 725/133, 141, 153, 38, 109, 112
   See application file for complete search history.

(56) References Cited

U.S. PATENT DOCUMENTS

| 4,847,698 A | 7/1989 | Freeman |
| 4,847,699 A | 7/1989 | Freeman |
| 4,847,700 A | 7/1989 | Freeman |
| 5,410,326 A | 4/1995 | Goldstein |
| 5,543,818 A | 8/1996 | Scott |

(Continued)

FOREIGN PATENT DOCUMENTS

| CA | 2 337 061 | 1/2000 |
| EP | 0854645 A2 | 7/1998 |

(Continued)

OTHER PUBLICATIONS

AR Accessories, "The remote with a high IQ!—Coming Soon" [retrieved online on Sep. 14, 2006]. Retrieved from the Internet: http://www.araccessories.com/msib21/Templates/WiQ.html.

(Continued)

*Primary Examiner* — Farzana Hossain
(74) *Attorney, Agent, or Firm* — Nelson Mullins Riley & Scarborough LLP; John S. Curran

(57) ABSTRACT

A method and apparatus for displaying information and content on a handheld wireless or other mobile device that is related to video content being presented on a nearby video device. The video content presented on the video device is delivered over a first communication channel and the related information and content displayed on the mobile device is delivered over a separate second communication channel from a remote server. The information and content received over the second communication channel is synchronized with the first primary video content so as to change automatically to correspond as the primary video content is presented on the video device.

81 Claims, 13 Drawing Sheets

(56) References Cited

U.S. PATENT DOCUMENTS

| | | | |
|---|---|---|---|
| 5,633,912 A | 5/1997 | Tsoi | |
| 5,689,799 A | 11/1997 | Dougherty et al. | |
| 5,733,131 A | 3/1998 | Park | |
| 5,774,664 A | 6/1998 | Hidary et al. | |
| 5,903,262 A | 5/1999 | Ichihashi et al. | |
| 5,907,322 A | 5/1999 | Kelly et al. | |
| 5,929,849 A | 7/1999 | Kikinis | |
| 5,956,025 A | 9/1999 | Goulden et al. | |
| 5,961,603 A | 10/1999 | Kunkel et al. | |
| 5,969,715 A | 10/1999 | Dougherty et al. | |
| 5,983,073 A | 11/1999 | Ditzik | |
| 6,016,142 A | 1/2000 | Withington et al. | |
| 6,061,719 A | 5/2000 | Bendinelli et al. | |
| 6,072,520 A | 6/2000 | Yuen et al. | |
| 6,072,521 A | 6/2000 | Harrison et al. | |
| 6,081,830 A | 6/2000 | Schindler | |
| 6,097,441 A | 8/2000 | Allport | |
| 6,104,334 A | 8/2000 | Allport | |
| 6,130,726 A | 10/2000 | Darbee et al. | |
| 6,204,796 B1 | 3/2001 | Chan et al. | |
| 6,204,885 B1 | 3/2001 | Kwoh | |
| 6,209,132 B1 | 3/2001 | Harrison et al. | |
| 6,246,441 B1 | 6/2001 | Terakado et al. | |
| 6,249,914 B1 | 6/2001 | Harrison et al. | |
| 6,263,505 B1 | 7/2001 | Walker et al. | |
| 6,278,499 B1 | 8/2001 | Darbee et al. | |
| 6,313,887 B1 | 11/2001 | Gudorf | |
| 6,349,410 B1 | 2/2002 | Lortz | |
| 6,438,751 B1 | 8/2002 | Voyticky et al. | |
| 6,567,984 B1 * | 5/2003 | Allport | 725/110 |
| 6,604,242 B1 | 8/2003 | Weinstein et al. | |
| 6,637,028 B1 | 10/2003 | Voyticky et al. | |
| 6,731,316 B2 | 5/2004 | Herigstad et al. | |
| 6,799,327 B1 | 9/2004 | Reynolds et al. | |
| 6,832,388 B1 | 12/2004 | Du Val | |
| 7,664,678 B1 * | 2/2010 | Haber | 705/26 |
| 7,712,125 B2 | 5/2010 | Herigstad et al. | |
| 2001/0018771 A1 | 8/2001 | Walker et al. | |
| 2002/0059575 A1 | 5/2002 | Watts et al. | |
| 2003/0041334 A1 | 2/2003 | Lu | |
| 2005/0015815 A1 | 1/2005 | Shoff et al. | |
| 2005/0028208 A1 | 2/2005 | Ellis et al. | |
| 2006/0190586 A1 | 8/2006 | Stewart et al. | |

FOREIGN PATENT DOCUMENTS

| | | |
|---|---|---|
| EP | 0993165 A2 | 4/2000 |
| EP | 1 059 809 A | 12/2000 |
| GB | 2343073 | 4/2000 |
| JP | 11-243512 | 9/1999 |
| JP | 2000-78488 | 3/2000 |
| JP | 2001-196955 | 7/2001 |
| WO | 98/16062 A1 | 4/1998 |
| WO | WO 98/43406 | 10/1998 |
| WO | WO 99/04568 | 1/1999 |
| WO | 99/34599 A1 | 7/1999 |
| WO | 99/40506 A1 | 8/1999 |
| WO | WO99/60782 | 11/1999 |
| WO | WO 00/59212 | 10/2000 |
| WO | WO 01/63392 | 8/2001 |

OTHER PUBLICATIONS

"BMW USA Website" [retrieved online on Jun. 5, 1997]. Retrieved from the Internet: Wayback Machine <URL: http://web.archive.org/web199706050200/http://www.bmwusa.com>.

Patent Abstracts of Japan, vol. 2000, No. 24, May 11, 2001, Abstract (English) of Japanese 196955.

TV compass, "The iTV Market" [retrieved online on Sep. 13, 2006]. Retrieved from the Internet: http://www.tvcompass.com/itv_market.html.

"Web Server." "HTTP Server." "Hypermedia." Microsoft Press Computer Dictionary, $3^{rd}$ ed. 1997.

Office Action for Australian App. Serial No. 2007200584, dated Dec. 17, 2008, 2 pages.

Office Action for Canadian App. Ser. No. 2,421,775, dated Jan. 27, 2009, 3 pages.

Office Action for Chinese App. Ser. No. 01815291.0, dated Dec. 3, 2004.

Office Action for Japan App. Ser. No. 2002-526113, dated Jun. 11, 2008, 10 pages.

Office Action for Korean Application No. 10-2003-7003408, dated Feb. 4, 2008.

European Search Report for European App. Ser. No. 01 975 737.6-1522, dated Nov. 23, 2007.

Office Action for Canadian App. Ser. No. 2, 421, 775, dated Nov. 26, 2010, 3 pages.

European Office Action for Application No. 01975737.6, pp. 1-6, dated Mar. 27, 2012.

European Office Action for Application No. 10180873.1, pp. 1-7, dated Mar. 28, 2012.

Chinese Office Action for Application No. 01815291.0, pp. 1-8, dated Mar. 26, 2012.

Chinese Office Action for Application No. 01815291.0, dated Dec. 13, 2011.

European Office Action for Application No. 10180873.1, 6 pages, dated Mar. 5, 2013.

Tanaka, Akira et al., "An Interactive Image Navigation System Using Technology for Linking Imaging and WWW," Proceedings of Interaction '97, Japan, Information Processing Society of Japan, vol. 97(1):47-48 (1997).

Japanese Office Action for Application No. 2008-264989, 6 pages, dated Nov. 22, 2012.

* cited by examiner

VIDEO INTERACTION WITH A MOBILE DEVICE AND A VIDEO DEVICE

CROSS-REFERENCE TO RELATED APPLICATIONS

This application is a continuation (and claims the benefit of priority under 35 USC 120) of U.S. application Ser. No. 09/950,321, filed on Sep. 10, 2001 now U.S. Pat. No. 7,712,125, which claims the benefit U.S. patent application 60/231,285, filed on Sep. 8, 2000, both of which are incorporated herein by reference.

BACKGROUND

This invention relates to video interaction.

One rudimentary level of television interaction, for example,—is achieved with a simple remote controller, which enables local control of the channel, volume, picture quality, and other aspects of the television presentation.

A variety of schemes also have been proposed to enable a user to interact more actively with the television program content.

SUMMARY

In the invention, the user is provided a significantly enhanced interactive capability by establishing a second parallel channel of interactivity on a personal digital assistant or similar device.

In general, in one aspect, the invention features a method that includes delivering interactive material at least partly wirelessly to a mobile device in the vicinity of a video device on which video content is being displayed, the interactive material being related to the video content.

Implementations of the invention include one or more of the following features. The interactive material is presented to a user in time synchronization with the video content. The interactive material includes an element (e.g., a displayed icon) for receiving input from the user. A tag is generated representative of a user's interest in an item of interactive material. The tag may be generated by capturing a time and a channel of video content, or by sending a query from the mobile device to a server at the time when a user indicates an interest in an item of interactive material, or by a server in response to a query from the mobile device. Or the server may broadcast tags that are dynamically synchronized with the video content. The interactive material includes information that includes at least one of the following: text, images, video, audio. The interactive material is received wirelessly at the mobile device. The video device comprises a television or video player. The interactive material supplements the video content. The mobile device comprises at least one of the following: a remote controller, a personal digital assistant, or a mobile telephone. At least some of the interactive material is delivered based on preference information associated with a viewer of the video content. In general, in another aspect, the invention features a method that includes receiving interactive material at least partly wirelessly at a mobile device in the vicinity of a video device on which video content is being displayed, the interactive material being related to the video content.

In general, in another aspect, the invention features a method that includes creating interactive material that is adapted to be delivered to or received at a mobile device in the vicinity of a video device on which video content is being displayed, the interactive material being created to be related to the video content.

In general, in another aspect, the invention features apparatus that includes a mobile device including software configured to cause the mobile device to present interactive material in the vicinity of a video device on which video content is being displayed, the interactive material being related to the video content. In implementations of the invention, the mobile device may include a display screen, a user input/output facility, and a wireless communication facility. The mobile device may be a personal digital assistant, a telephone, or a remote controller.

In general, in another aspect, the invention features apparatus that includes a server including software configured to deliver interactive material at least partly wirelessly to a mobile device in the vicinity of a video device on which video content is being displayed, the interactive material being related to the video content.

In general, in another aspect, the invention features a storage medium bearing software adapted to configure a device to receive interactive material at least partly wirelessly at a mobile device in the vicinity of a video device on which video content is being displayed, the interactive material being related to the video content.

In general, in another aspect, the invention features a storage medium bearing software adapted to configure a device to deliver interactive material at a mobile device in the vicinity of a video device on which video content is being displayed, the interactive material being related to the video content.

In general, in another aspect, the invention features a method that includes receiving at a server an identification of video content, identifying interactivity material related to the video content, and enabling a user to interact with the interactivity material in connection with viewing of the video content. In implementations of the invention, the user is enabled to indicate interactivity material of interest to him, tags are generated in response to indications of the user of material that interests him, the material of interest is provided to the user at a later time based on the tags, and the interactivity material is presented to the user synchronously with the related video content.

Among the advantages of the invention are one or more of the following:

Instead of requiring modifications to the video content broadcast stream or demanding that a user purchase additional equipment the invention works with existing video systems and a user's handheld device, requiring only an Internet connection.

The invention incorporates an intuitive, aesthetic interface that allows a user simply to tap on the screen of his handheld when TV content of interest appears on the TV screen.

For the content provider, all that is required is to provide the information necessary for the interactive links on their own servers.

The invention allows PDA and mobile phone users to expand their TV viewing experience by letting them "grab" subjects or individual items in TV programs or commercials to expand the viewing experience and gather further information on content of interest. The invention resolves the design battle for screen real estate by allowing the enhanced television experience to occur in the palm of the hand, rather than on the television set. The invention avoids interrupting the viewing experience, which is protected because the user is not required to deal immediately with the grabbed content.

The invention enhances television commercials, allowing users to acquire additional information as well as purchase goods. Advertisers can offer users targeted promotions as well as gain instant feedback about the effectiveness of their advertising.

The invention enables a user's mobile device to act also as a universal remote control for the user's television and entertainment system. The mobile device can also display functions of an Electronic Programming Guide (EPG), give specifically targeted promotions for programming, and offer easily accessed program schedules, all within the same device that provides the content enhancements.

Given user permissions, the mobile device can organize content "grabbed" by the user so that content is hierarchically displayed according to a user's pre-set interests. Advertisers can use this information to offer user-targeted promotions. The system can also allow filtering to streamline the display based on the user's preferences. For instance, a hockey fan viewing enhanced sports content from a news broadcast may not want to see further information on the day's tennis match. He can set his profile to indicate this.

Other advantages and features will become apparent from the following description and from the claims.

DESCRIPTION

Figure 24:
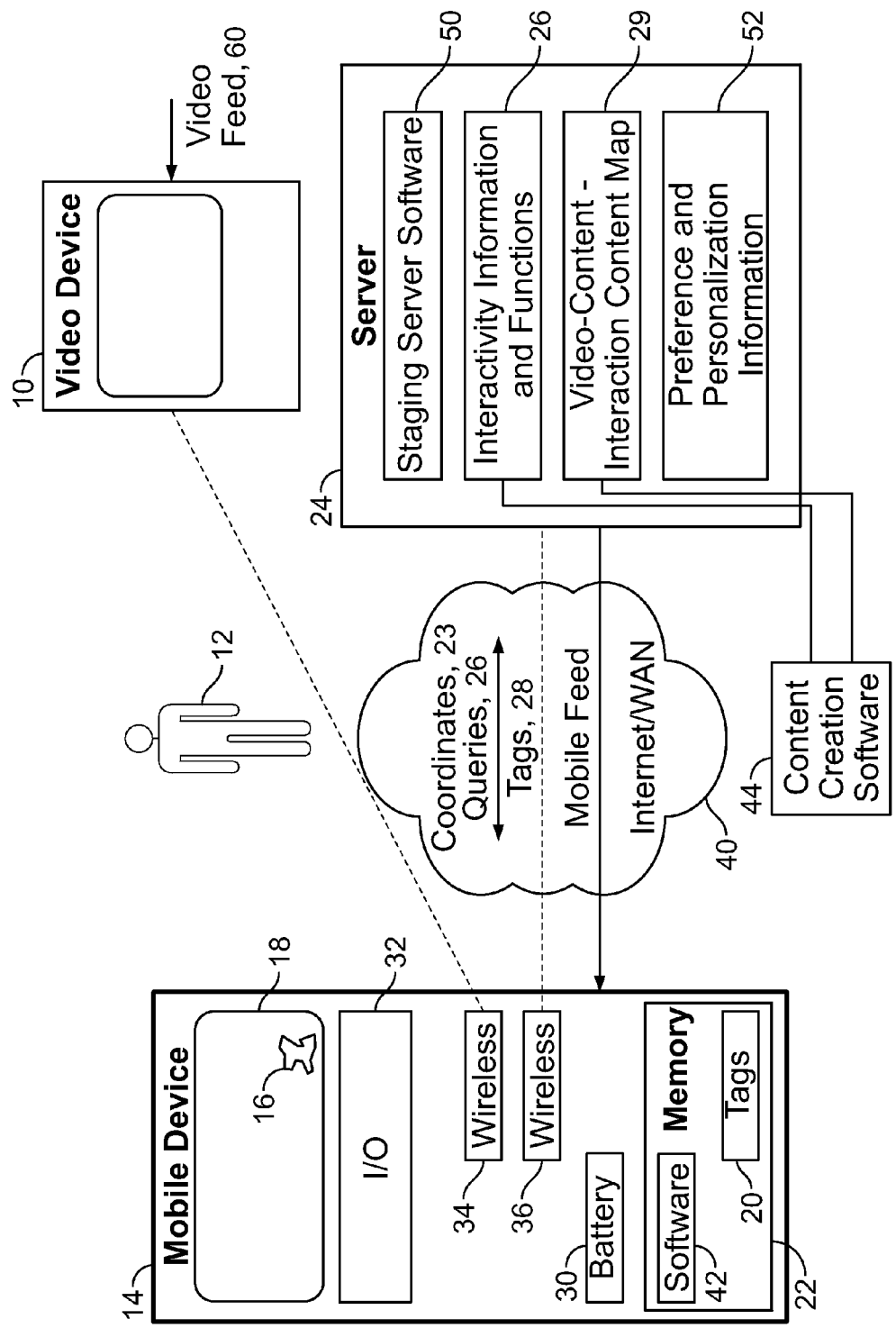
FIG. 24 is a block diagram.

As shown in FIG. 24, a user's experience in viewing and using video content on a video device 10 can be enhanced by enabling the user 12 to interact with a mobile device 14 (such as an advanced remote controller) that is synchronized with the video content, for example, by indicating other content that may be of interest to the user. As the user views the video content, he may be prompted periodically, e.g., by a "hot" icon 16 on a display 18 of the mobile device or in some other way, of an opportunity for interactivity that coincides with or is related to the video content.

The viewer may indicate an interest in the available interactivity by, for example, invoking the icon, which triggers the generation of a tag 20. The tag may be stored in the local memory 22 of the mobile device 14 and/or provided in some way to a remote server 24. The tags enable the server to provide the interactivity to the user either immediately or at some later time or in some other way.

Tagging can occur in any of at least the following four ways:

1. The tag can be a timestamp that captures the time (using a system clock on the mobile device) and the channel of video content that is being viewed at that time. The time and channel identity can together be called the "coordinates". When the coordinates 23 are sent to a remote server 24, the server can retrieve interactivity information and functions 26 corresponding the coordinates and can return the information or provide the functions to the mobile device.

2. The tag can be in the form of a query 26 sent to the server at the exact time that the user indicates interest by invoking the icon. The server responds with the corresponding information or functions, which are then stored in the remote device for use in interacting with the user.

3. The tagging can be done by server in response to the mobile device querying the server at the exact time of the viewer's indicated interest. The server may generate the tag including embedded links 28 and return it to the mobile device, where it is stored. Later, by clicking on a displayed version of this tag and on displayed versions of the embedded links, the user can access the server to retrieve the interactivity information or functions.

4. Alternatively, the server may constantly broadcast a changing set of tags that are dynamically synchronized to the changing video content being viewed by the user. The mobile device displays the tags as they are received. When the user sees something of interest, he invokes the currently displayed tag, which corresponds to the current video content. The tag holds embedded links and the user can then access interactivity information or functions that correspond to the links.

The tagging methods allow the user to access and retrieve additional information and functions synchronously or asynchronously to the changing stream of video content. For example, the additional information or functions could involve (a) additional news that supplements news contained in the video content, (b) e-commerce opportunities, (c) web pages on the Internet, (d) participation in newsgroups, (e) an opportunity to ask questions, (e) setting the mobile device to perform some action such as recording future video content or (f) any other information, action or transaction that the host of the remote server 24 chooses to make available.

The mobile device 14 may be powered by a battery 30 and include an input/output capability 32, such as a touch screen, a keypad, or a microphone to receive voice. A wireless access capability 34 may be included to provide for wireless access to the video device both to control the video device (much as a conventional remote controller would do) or to display information on the video device. A second wireless access capability 36 provides wireless access to the Internet or other wide area network to carry the tags, queries, coordinates, and interactivity information and functions. (In some cases, wireless access 34 to the video device will be sufficient to provide the functions of wireless capability 36 if the video device has the ability to communicate through the network 40.)

The mobile device runs software 42 that is configured to perform the following functions: (1) provide secure networking capability to access the server 24 through the network 40, (2) display text and images, and perform sound and video, (3) tag information as explained earlier, and (4) store information as explained earlier.

The interactivity information and functions, which can together be called the "interaction content" 46, are created by an interaction content creator using content creation software 44, and then loaded into the server for use at run time. The content creator develops the interaction content based on the video content on various channels of the video feed 60 that are known to the creator in advance of the feed being delivered to the user's video device. Each item of interaction content may be related to one or more segment of video content and may be associated with that segment as part of the content creation.

The content creation software provides the following functions: (1) a graphical user interface that enables the content creator to author information and functions that are to be synchronized to video content that will be conveyed to the user, (2) a tag generation function that enables the creator to build tags that include audio, video, text, and images, (3) a function that enables a content creator to build icons and interactivity information and functions, (4) the testing of software to validate links, and (5) staging software to mount finished interactivity content to the staging server 24. The interaction content is loaded into the interactivity information and functions 26 stored at the server. At the same time, a table or map 29 that associates video content segments with related interaction segments can be loaded into the server.

The server runs server staging software 50 that (1) manages and hosts interactivity content 46 created using the content creation software, (2) affords networking capability to manage multiple simultaneous requests from mobile devices, (3) manages preference and personalization information 52 that customizes the interactivity content to the user, (4) builds reports on usage to enable feedback for advertising and marketing purposes, and (5) enables creation and recording of e-commerce transactions. At run-time, the server can use tags generated by user interaction with the mobile device indicating the video content being viewed to identify and serve related interaction content, based on associations stored in the map 29. The server can also base the interaction content on the more general preference and personalization information 52.

Referring in more detail to the mobile device, the wireless capability 34, 36 could use any of a wide variety of protocols including PCS, cellular, Bluetooth, 802.11, WiFi, Infrared, or alternative technology. The mobile device could be able to connect to and control the video feed 60 that drives the video device, for example, in the way that a universal remote controller controls a television, VCR, settop box, or other video device. The mobile device must also simultaneously connect to the network 44.

The mobile device could be, for example, a wireless-enabled PDA such as a Compaq iPaq or Palm Pilot or an advanced functionality remote controller of the kind that includes a color LCD screen, an infrared link to control the television, VCR, settop box, or other video device, and an 802.11b card to connect to a local area network to provides access to the Internet.

In one example of the use of the system, a user watching a television would also see a video or still picture on the screen of his remote controller that is serving as the mobile device. The video or still picture (which may be thought of as a mobile feed 62 that is separate from the video feed) changes continually (as arranged by the content creator) to correspond to the video content carried on the video feed.

If the user changes the channel of the video feed using the remote controller, the mobile feed is automatically changed by the server to the new channel. The information and functions on the remote controller are updated in real-time over the network and are synchronized with the video feed by the server.

From time to time, the mobile feed displayed on the remote controller will display a "hot" icon to prompt the user that interactivity is available. The interactivity opportunity is predetermined by the content author of the mobile feed. If the video content on the video feed piques the user's interest at the time of the prompting, the user can tap the hot icon on the screen (or invoke the interactivity opportunity by voice command or keyboard), which tags the content. From a user interface perspective, when the user tags the content, the hot icon moves from the mobile feed window to a folder or area where it is stored for later access. The stored icon then represents the link that the user can later click to access interactivity information or functions that the author of the tag has created. The user can access, save, store and send the information or function. The author of the tag can determine whether the user can edit the information or function. The user may choose to access the tagged information on the mobile device or may send it to another device such as a computer, television or other device that has a screen and input/output capability. The interactivity content is portable and may be sent to other people and other devices.

To enable the synchronization of content between the video feed and the mobile feed, the mobile device is able to identify the channel of the video feed is on and report the channel to the server. If the mobile device is one that has remote controller functionality, then when the user changes channel, the channel identity is automatically known to the controller and can be reported to the server.

Alternatively, the user may specifically enter the number of the channel into the mobile device at the time he changes channels, or the television, settop box, or VCR may send the current channel information to the mobile device at the time the user changes the channel. By determining the channel information, the mobile device can provide information to the server necessary to synchronize the mobile feed with the video feed.

The content creation software may be similar to a simple version of website development software.

The mobile feed controls the synchronization of the video feed with the information that the mobile device retrieves. Sometimes, the mobile feed can provide ancillary information to augment or complement the video feed. The content creation software also provides tools to embed in the mobile feed hot icons to indicate interactivity. It also has a module to create the links and to build the tags and information that are staged on the server and will be viewed on either the mobile device or other end user device.

The server stages the mobile feed and the embedded links The content creator uses available software to create both the mobile feed and the embedded information which the user accesses when the user tags the content. The mobile feed may be text, a picture or even full video.

The source of the video feed and the source of the mobile feed can be located in one place or in two different places An example of a user interface that could be provided to a user of a mobile device is illustrated in FIGS. 1 through 23. During a television show, the PDA may display images or information that relate directly or indirectly to what is being shown on the television program.

The user can bookmark or flag (i.e., tag) pieces of information that come from the mobile feed as he sees them on the PDA. Items that are bookmarked or flagged can be retrieved later from the server at a time convenient to the user.

For example, if the user sees a short clip of a program, such as a baseball game, on the television, he can indicate through the PDA interface that he wishes to bookmark the program. Later he can retrieve additional information about the program from the server.

In general, the invention enables a user to work with a second parallel synchronized source of information and interaction while watching a television show, to identify items of interest that are displayed on the PDA, and to later retrieve or take some other action with respect to the items of interest.

Figure 1:
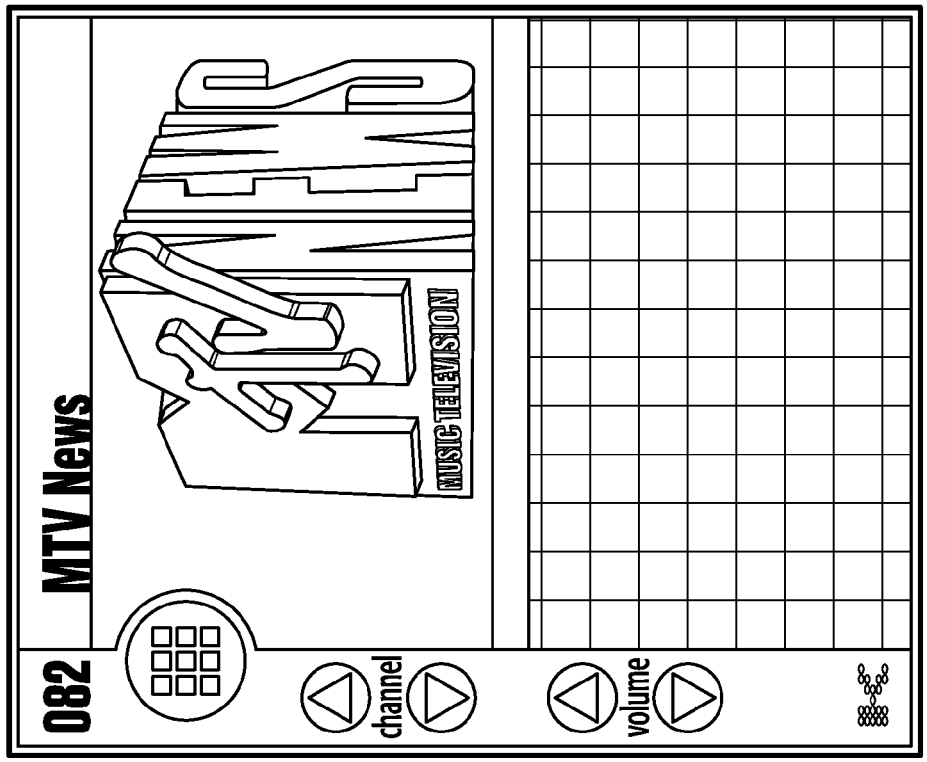

FIG. 1 shows the channel and volume controls on the left side that would be used for remote control of the television. The current channel is MTV News, channel 082.

Figure 2:
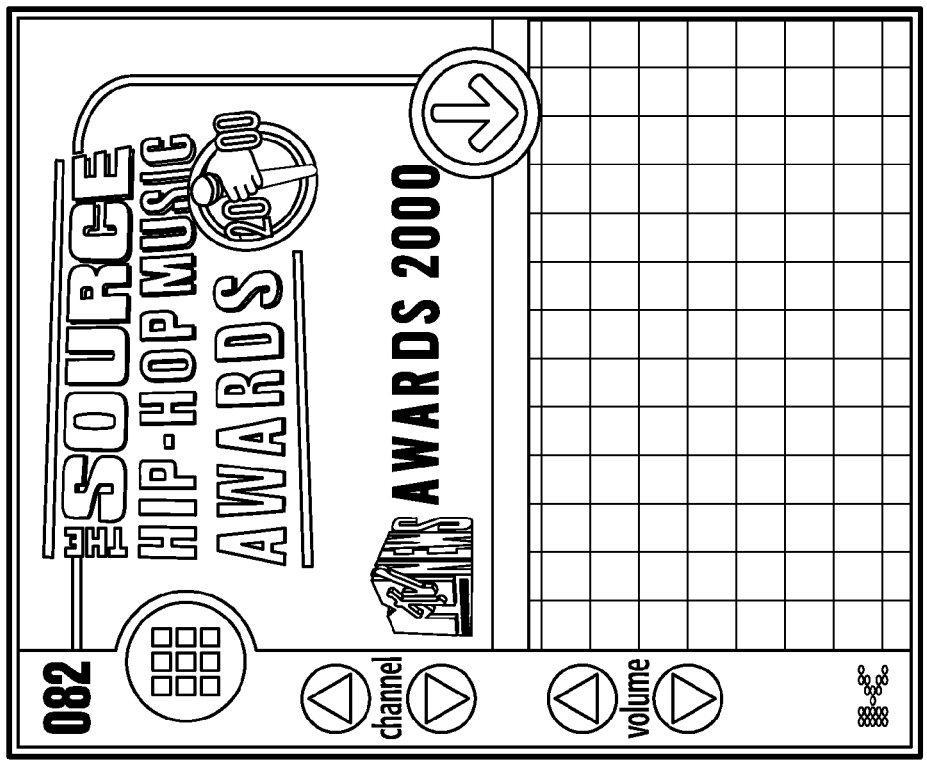
FIGS. 1 through 23 show user interface screens.

FIG. 2 shows a banner related to "The Source Hip-Hop Music Awards" which is associated with a related segment being shown on the television. If the user is interested in bookmarking this item, he presses on the place where the down arrow is shown and his request is transmitted to the server for storage.

Figure 3:
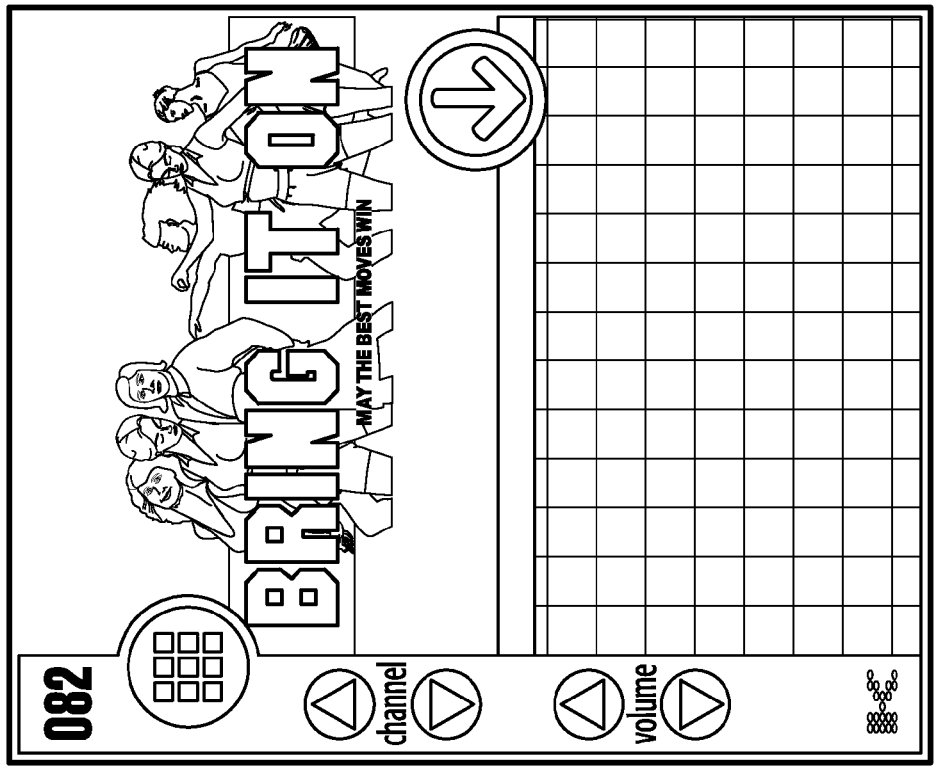
Figure 6:
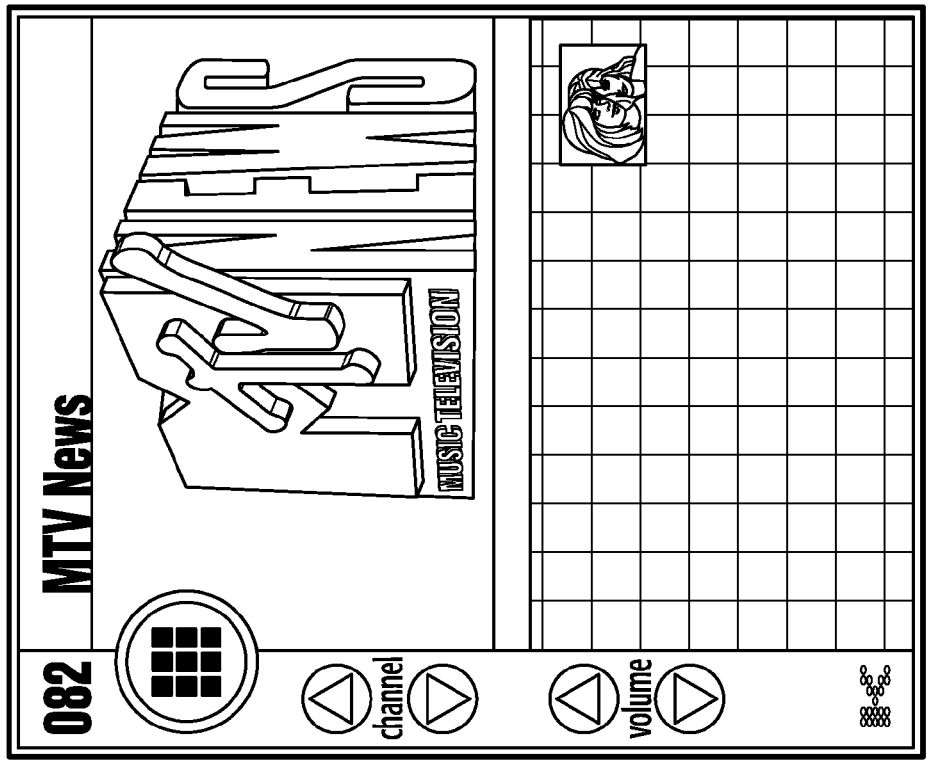
Figure 5:
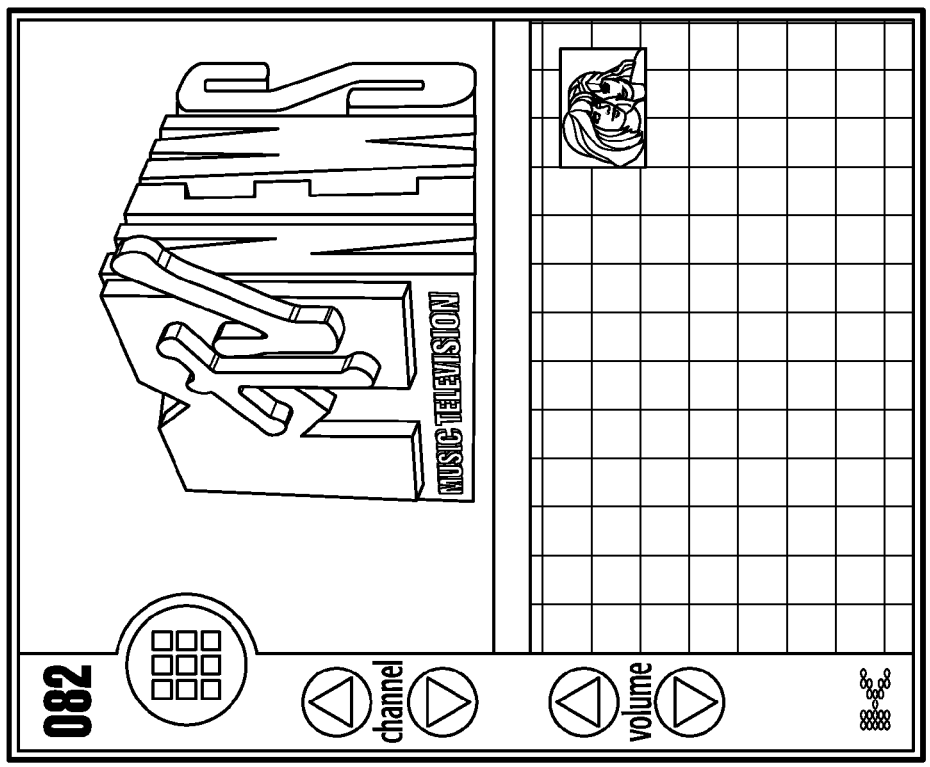

On FIG. 3, a different banner is shown and the user again has the opportunity to bookmark the item by pressing the down arrow.

Figure 4:
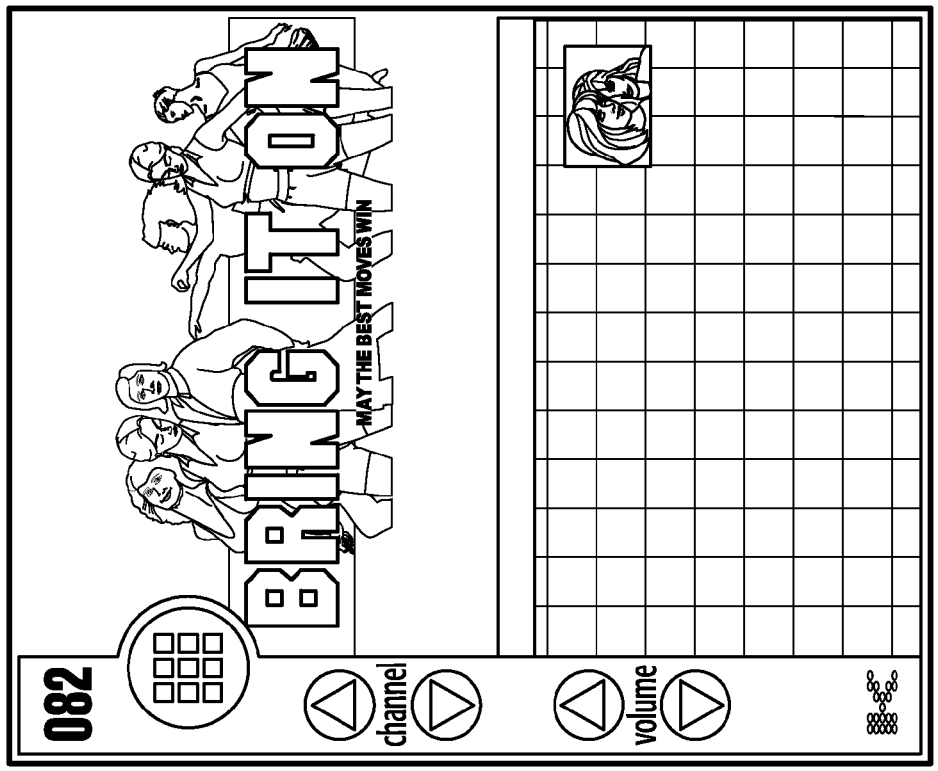

On the next screen, FIG. 4, an icon associated with the banner that appeared on FIG. 3 is shown in the bottom half of the screen indicating that the user has bookmarked this item.

Figure 7:
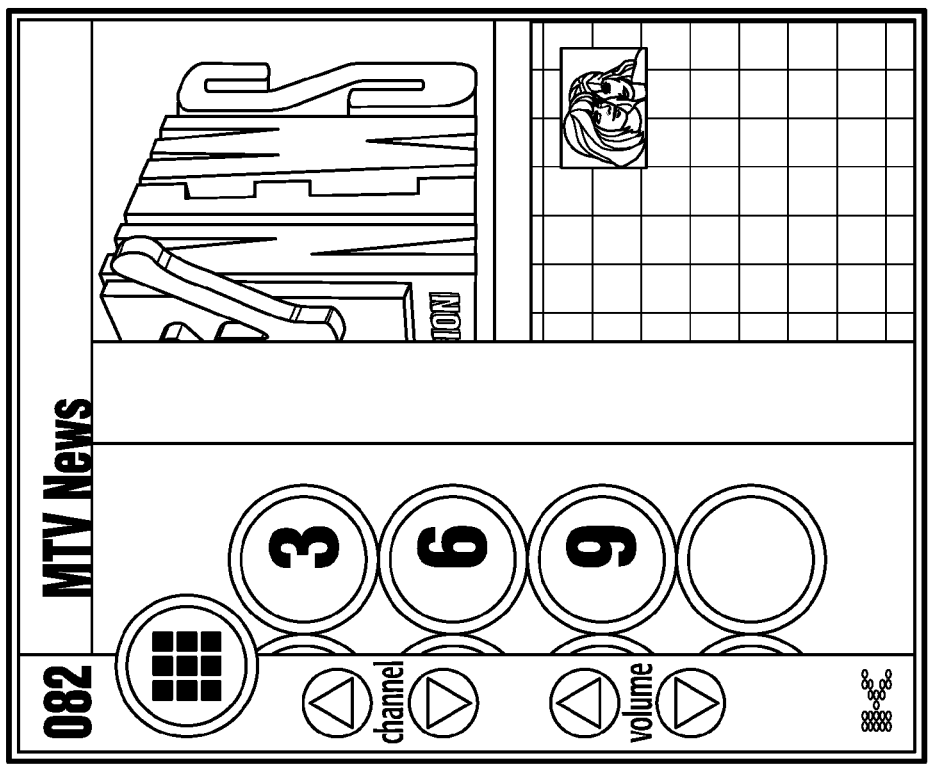

On FIG. 7, the user has pressed the nine button icon in the upper left corner, indicating a desire to enter information on a numeric keypad and the buttons of the icon have turned black.

Figure 8:
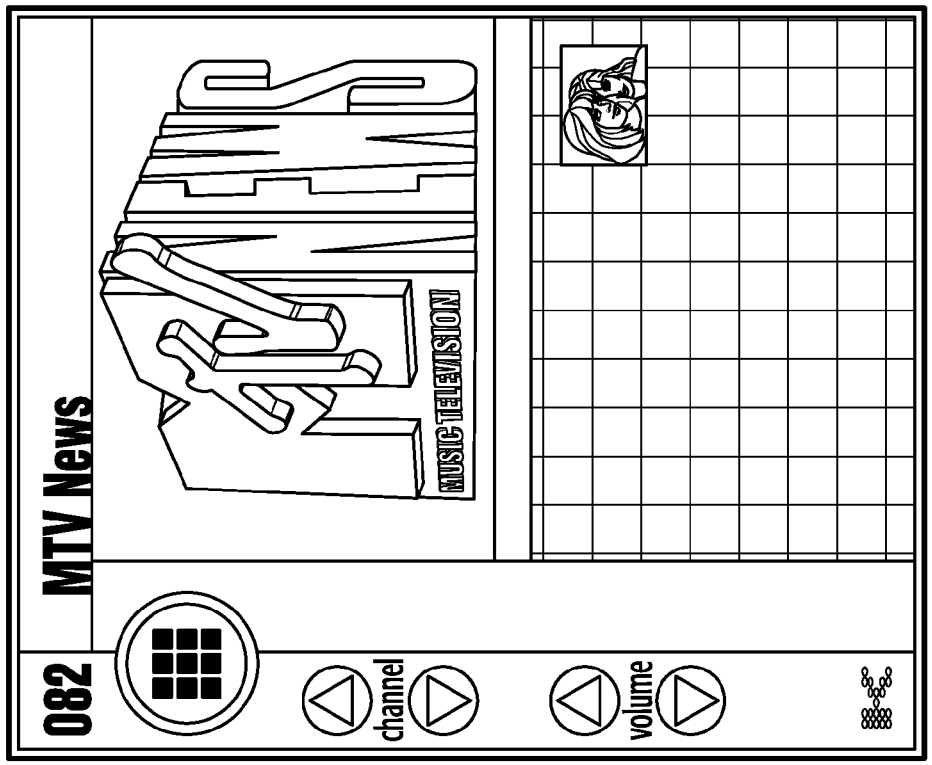
Figure 10:
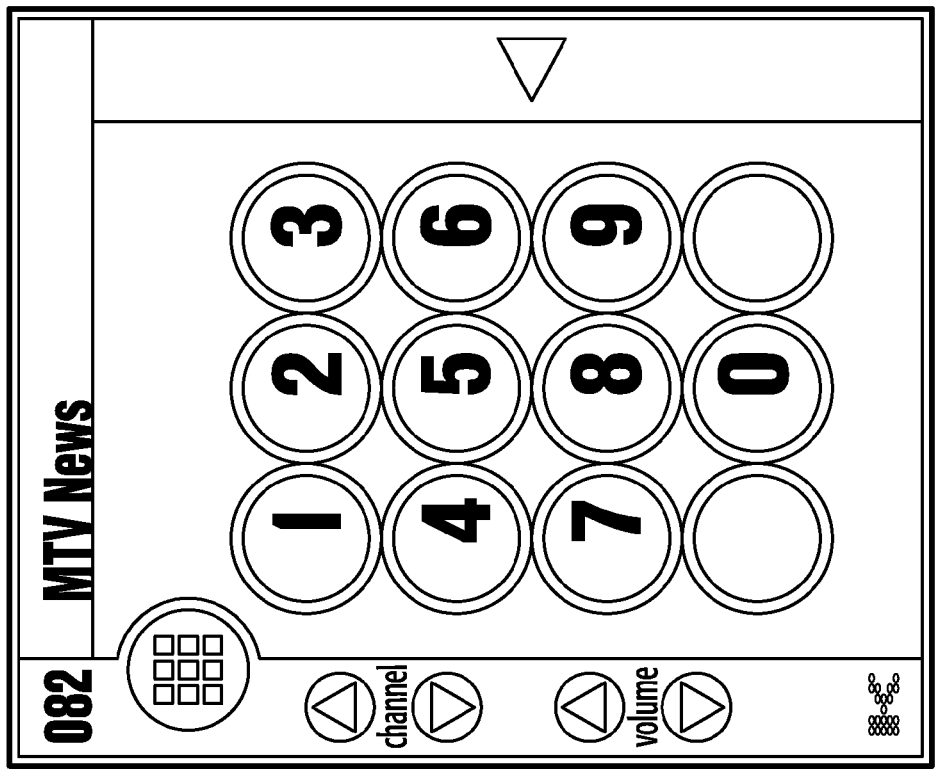
Figure 9:
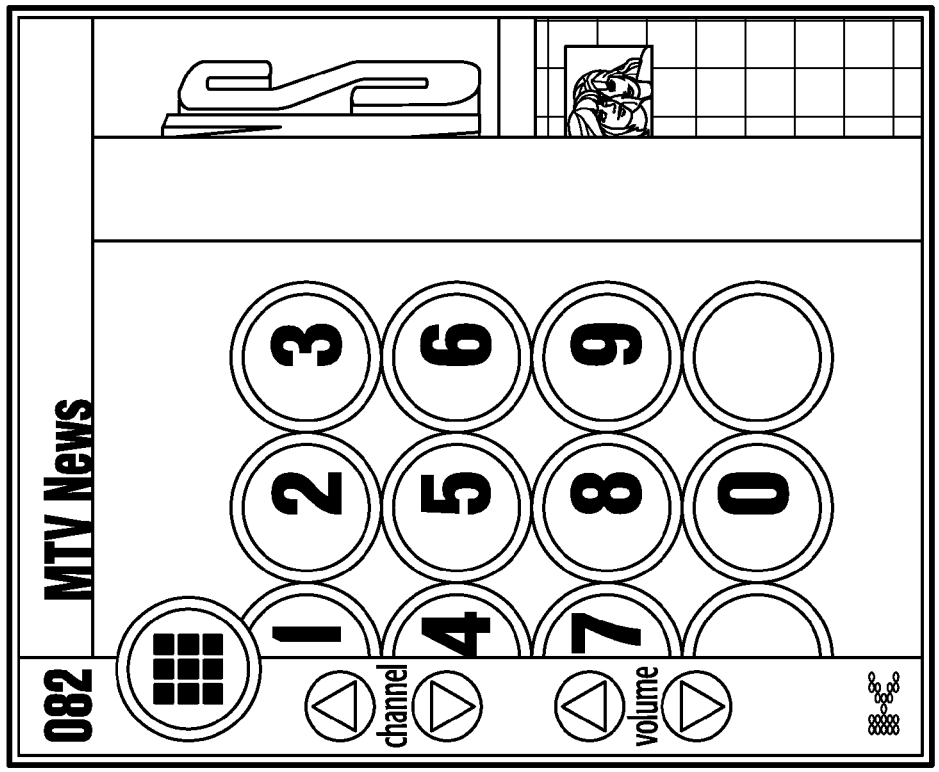
Figure 12:
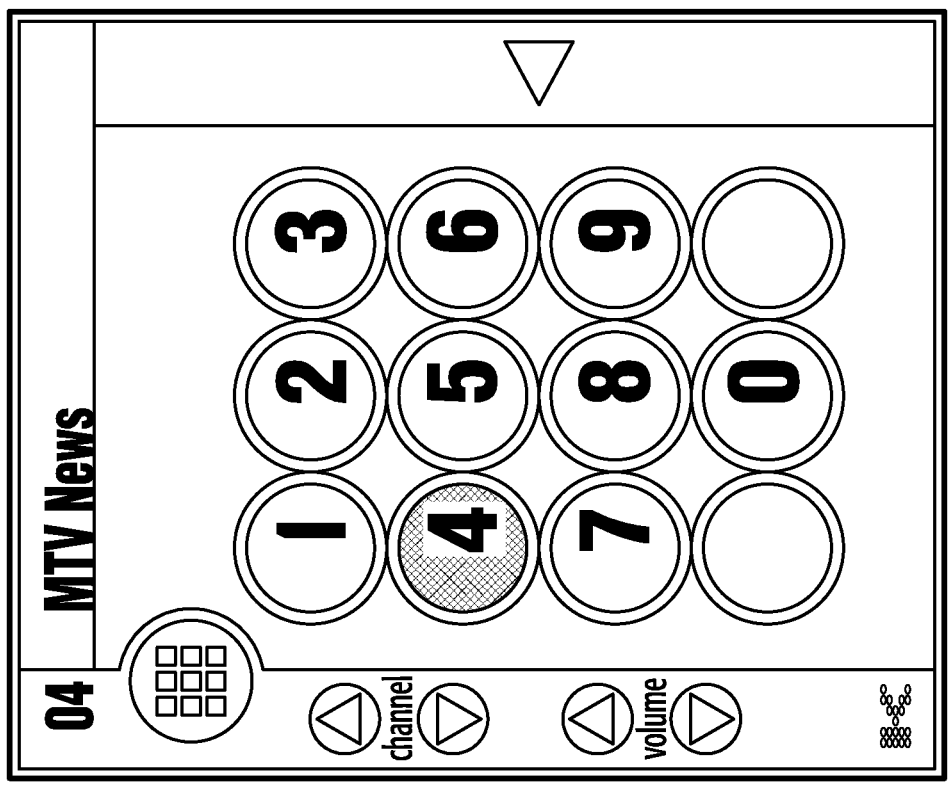
Figure 11:
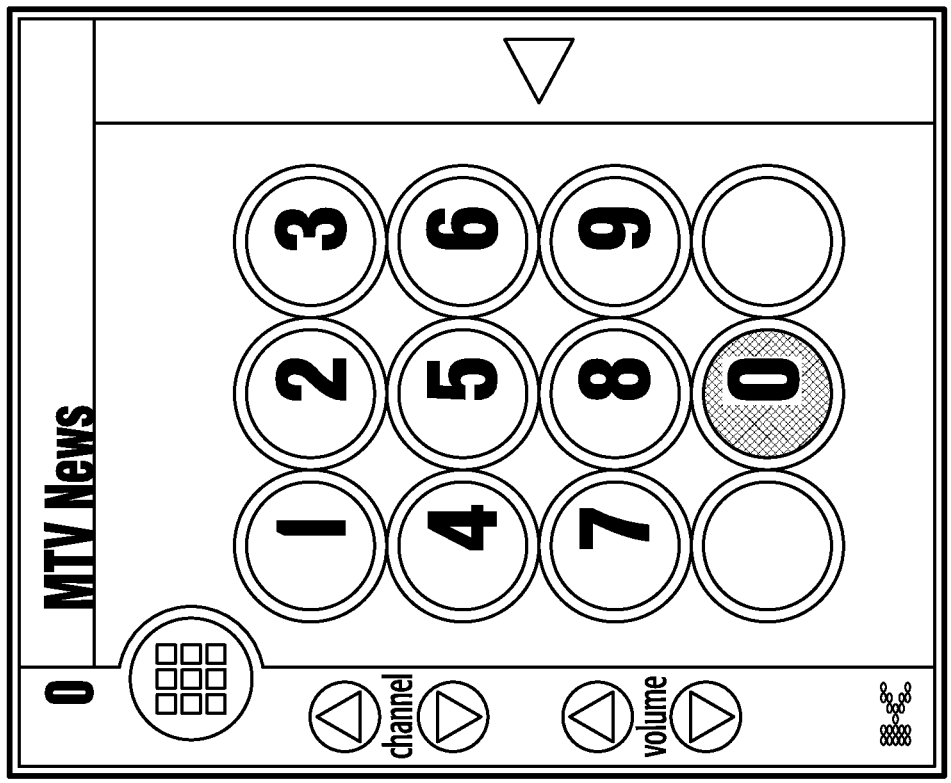
Figure 14:
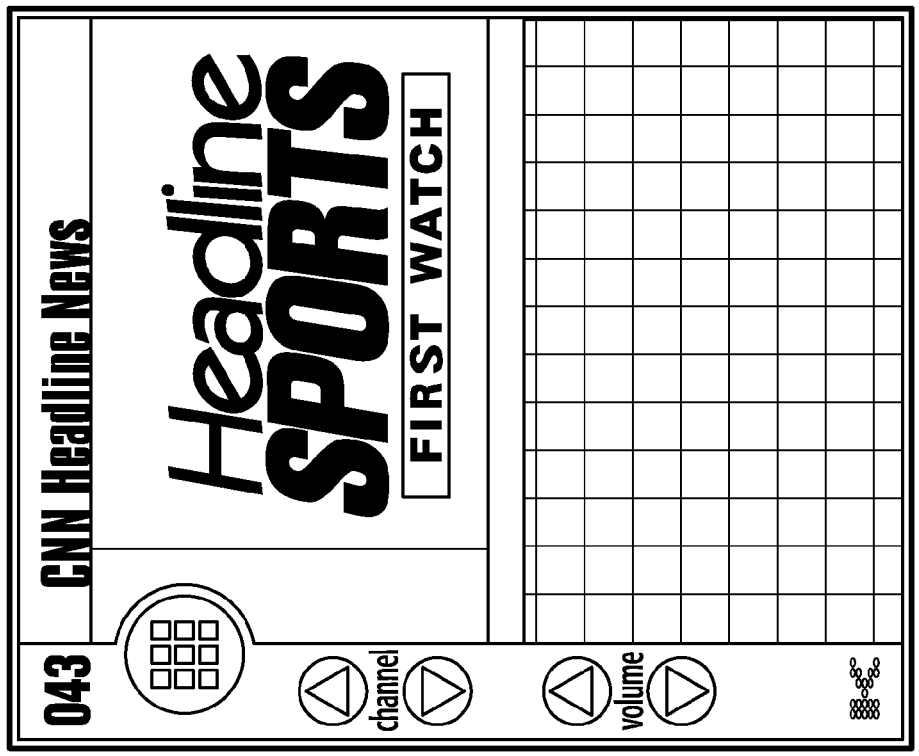
Figure 13:
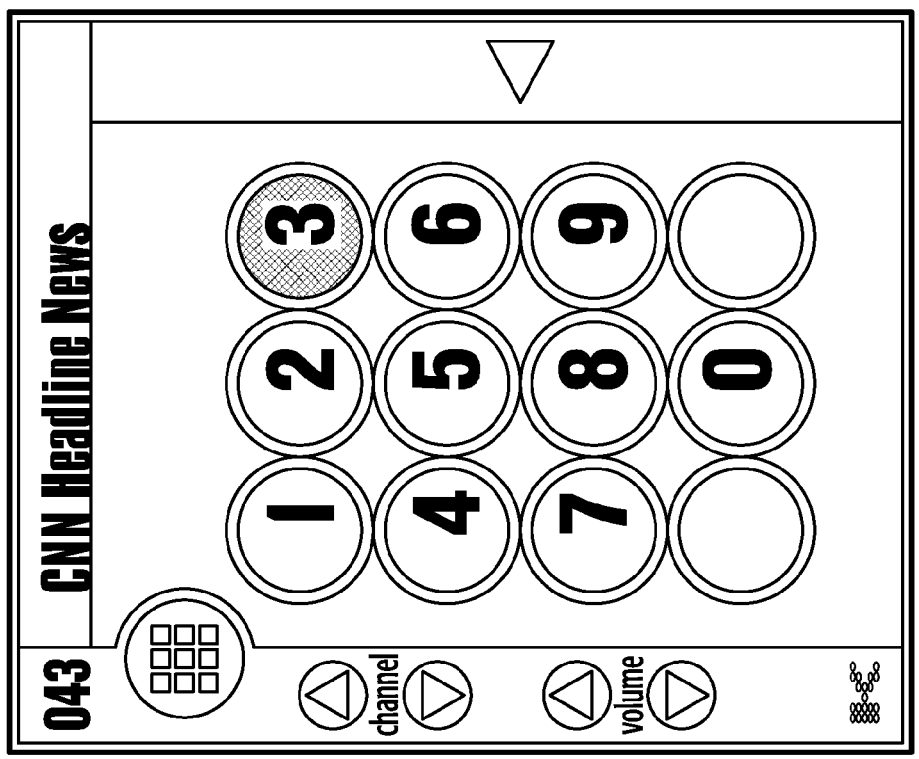

In FIGS. 8, 9, and 10, the keyboard is scrolled from left to right onto the screen. In FIGS. 11, 12, and 13, the user has pressed 043 to change the channel to CNN Headline Sports. The information is sent to the Internet server, which then changes the program material that is being transmitted to the user's television. The banner for that program is then displayed on the top of the screen.

Figure 15:
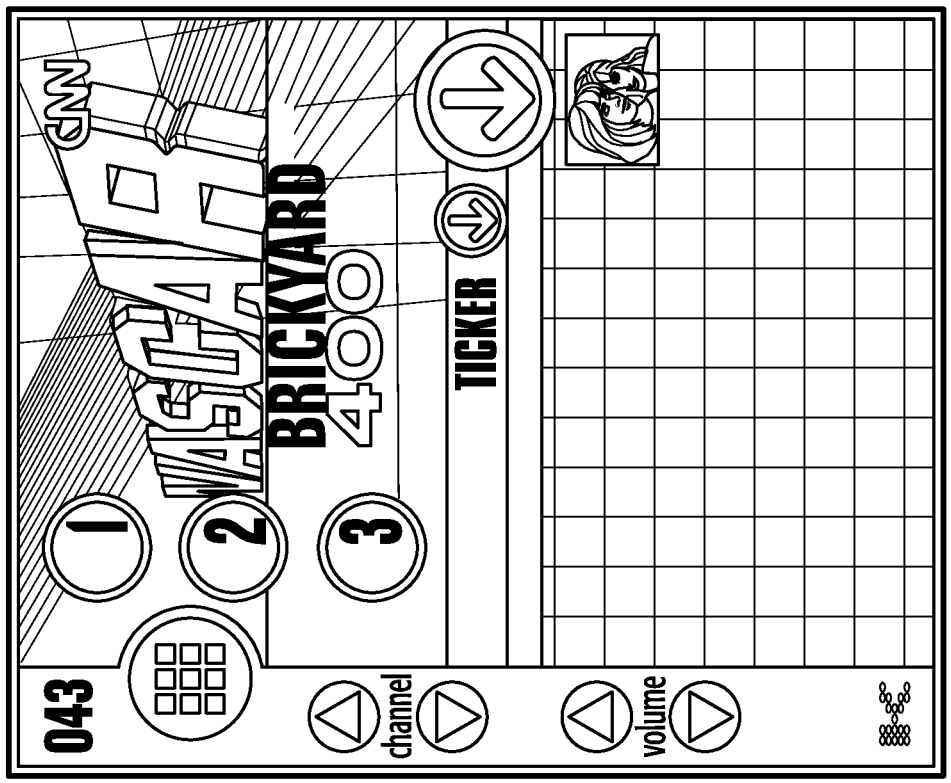

In FIG. 15, the user sees a banner for the NASCAR Brickyard 400 program and has the opportunity to press a large down arrow to bookmark it or to press a small down arrow that is labeled ticker.

Figure 16:
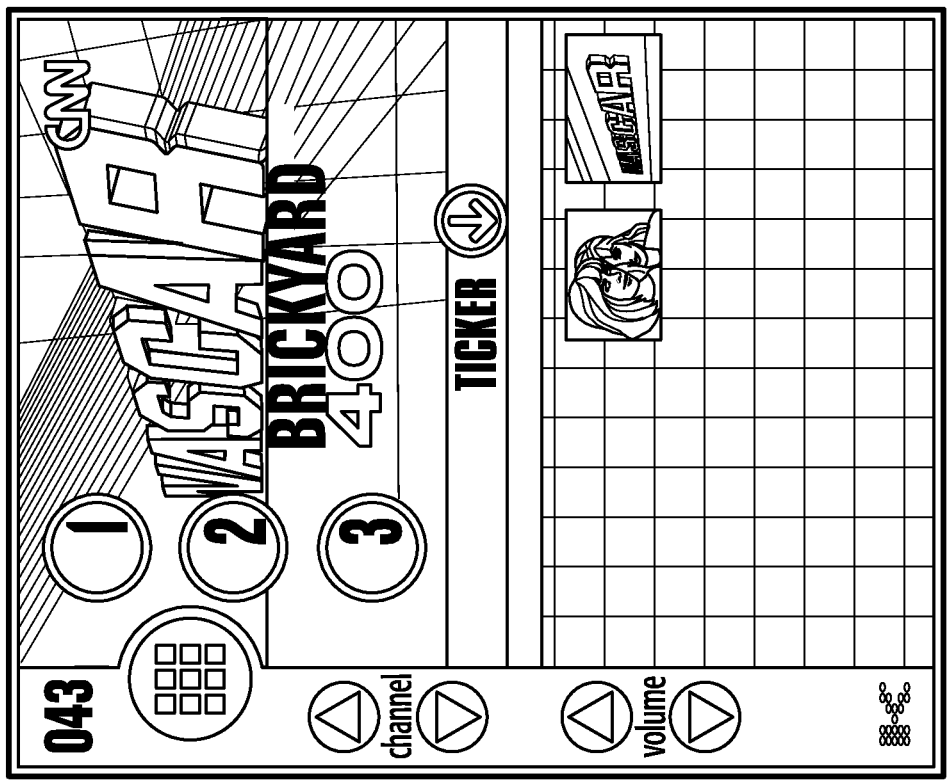

In FIG. 16, the NASCAR icon has been added to the bookmarked items.

Figure 17:
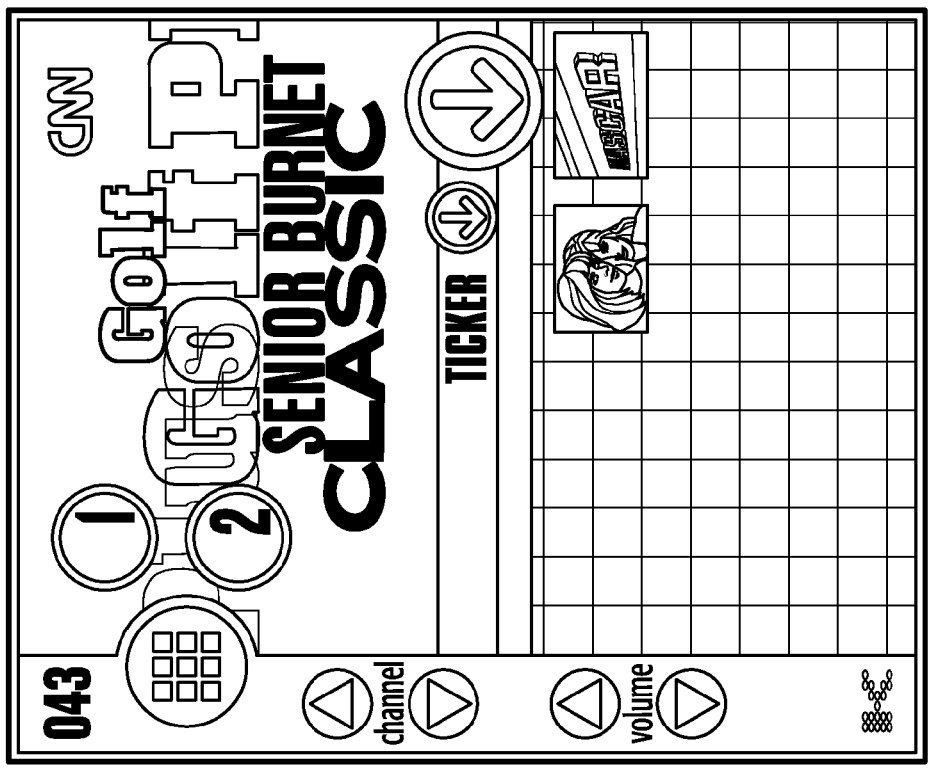
Figure 20:
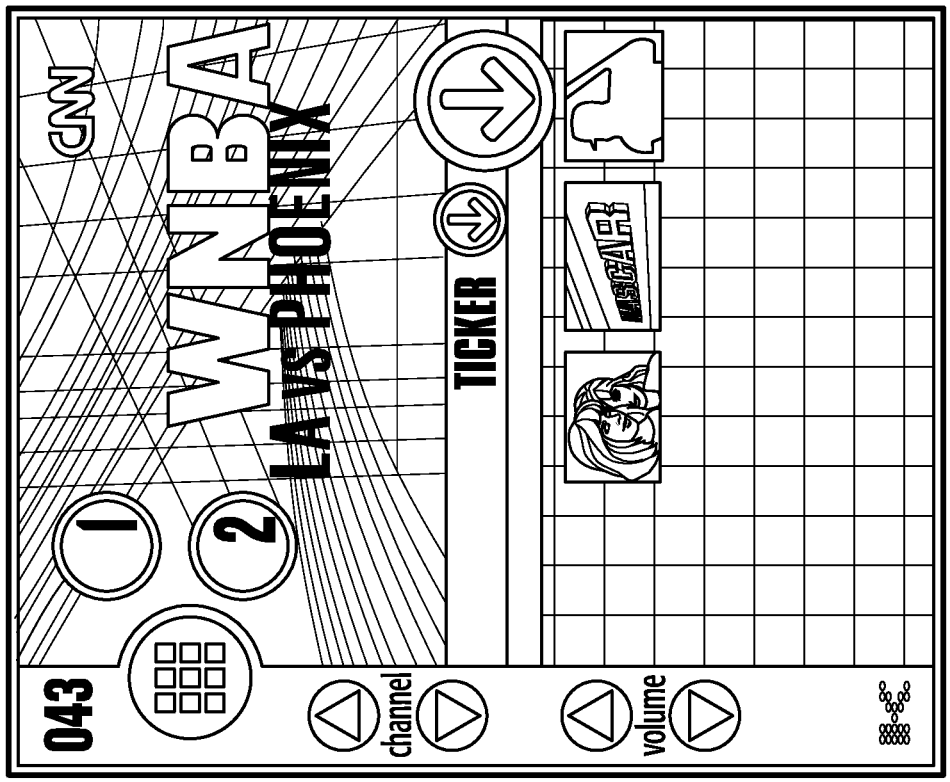

In FIG. 17, the banner has changed to the Senior Burnet Classic in accordance with a short item being shown at the same time on the television. As before, the user has the chance to add this to his bookmarked set at the bottom half of the screen.

Figure 18:
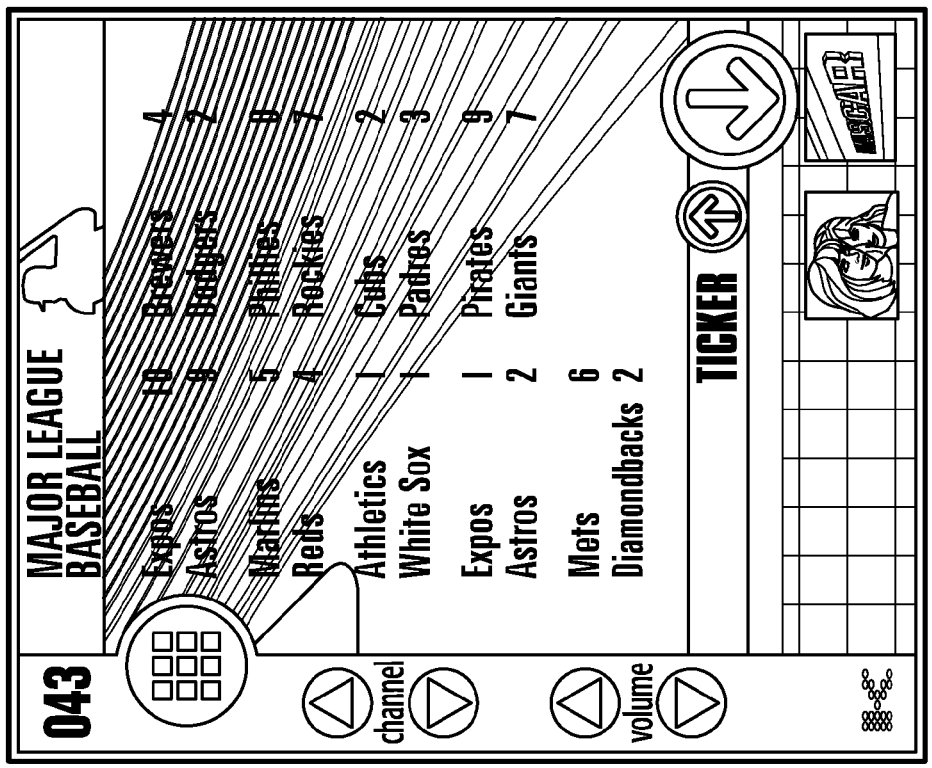
Figure 19:
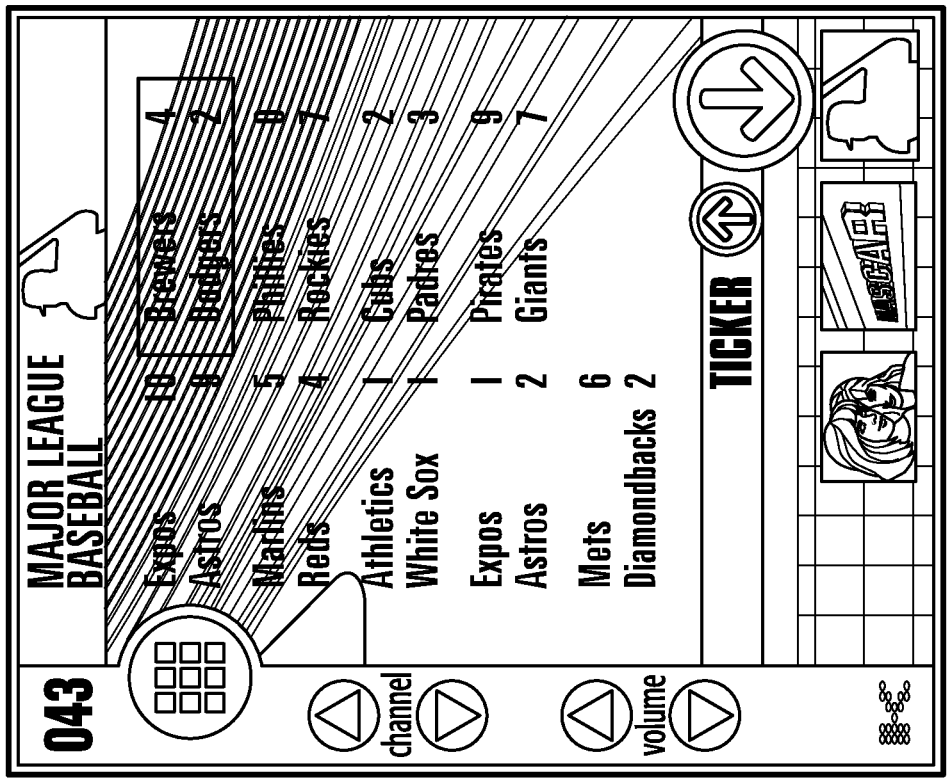
Figure 22:
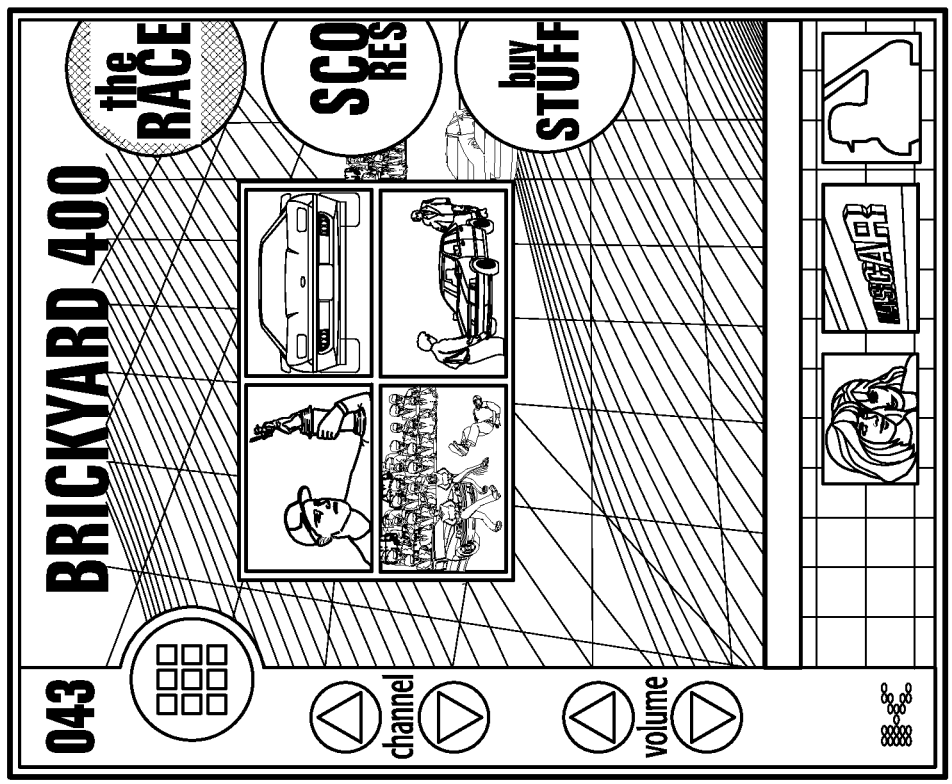

In FIG. 18, the Major League Baseball scores are shown. In FIG. 19, the user has highlighted the score of the Brewers-Dodgers game and added it to the bookmarked items.

Figure 21:
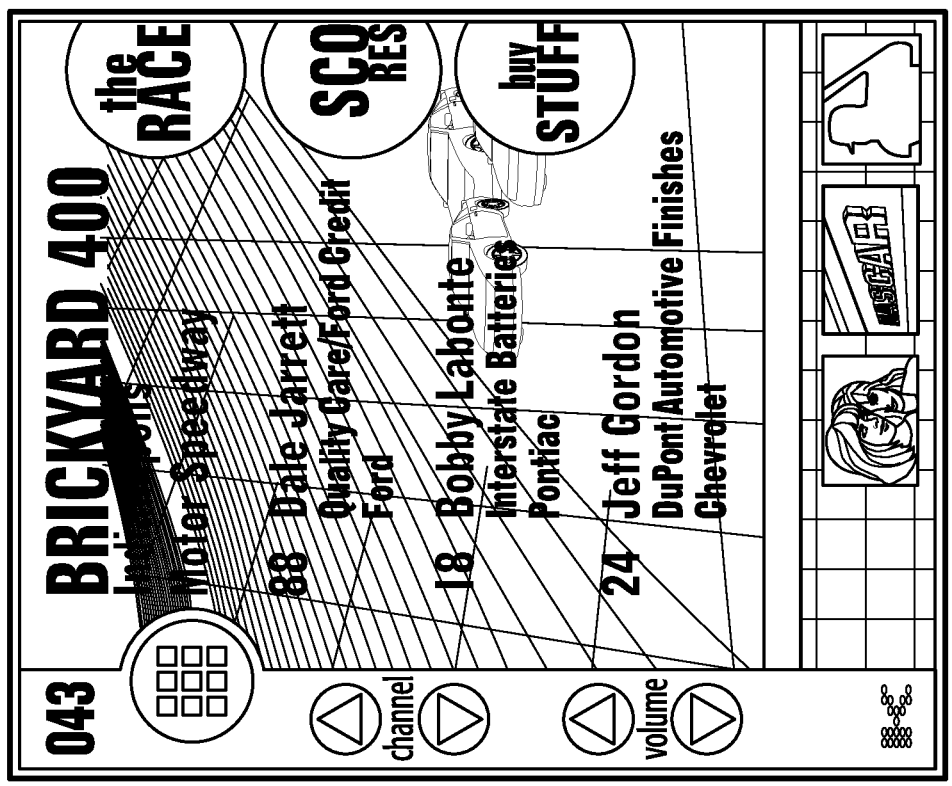

In FIG. 21, the user is shown information about the Brickyard 400 race, including the three leading contenders. The user is given the chance to view the race or scores or to buy stuff On FIG. 22, the user has pressed the item the RACE and is shown four thumbnails of race pictures.

Figure 23:
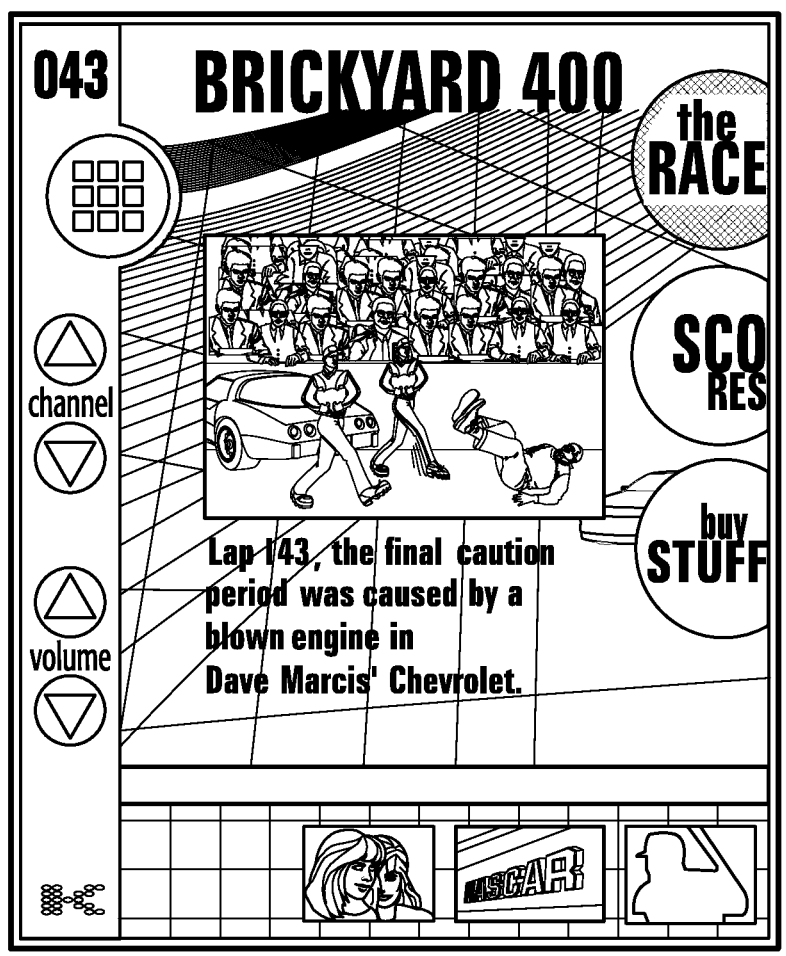

By pressing on the lower left-hand picture, the user is shown an enlarged image on FIG. 23 together with a text caption.

The ticker arrow allows the user to scroll through an entire sequence of different short clips, just as, for example, the television may broadcast a series of short clips of baseball games. Because the Internet server has personalization information about the user on the server, the ticker can be altered to suit the user's tastes so that when he presses the ticker arrow, he sees a sequence of short clips that are interest to him.

Any icon that has been generated as a result of bookmarking can be invoked at any time by the user by simply pressing that icon. Then the Internet server will serve images, video, or information related to that icon.

Other implementations are within the scope of the following claims.

The invention claimed is:

1. A method comprising:
   while primary video content is being presented through a first communication channel on a primary video device, on a handheld wireless device, displaying information describing video content available for viewing on the primary video device, the information delivered as a mobile feed to the handheld wireless device at least partly wirelessly from a remote server through a second communication channel, the information delivered in response to an identification of the video content and being generated and sent to the remote server by the handheld wireless device, the identification not based on information received from the primary video device, the mobile feed including interactive material that is related to the primary video content, the mobile feed synchronized with the primary video content so as to change automatically to correspond as the primary video content is presented on the primary video device, the second communication channel separate from the first communication channel; and
   subsequent to user input in response to the displayed information, displaying and storing a graphical element representing the information for later retrieval.

2. The method of claim 1 comprising displaying second information describing second video content available for viewing on the primary video device, the second information received through the second communication channel.

3. The method of claim 1 comprising displaying information on the handheld wireless device related to the primary video content displayed on the primary video device.

4. The method of claim 1 in which the information describing video content available for viewing is displayed in response to user input.

5. The method of claim 4 in which the user input comprises an invocation of the graphical element.

6. The method of claim 1 comprising receiving the information describing video content from an Internet server.

7. The method of claim 1 comprising displaying a graphical element representing interactivity material.

8. The method of claim 1 in which the information describing video content includes an image.

9. The method of claim 8 in which the image comprises a thumbnail image.

10. The method of claim 1 in which the information describing video content includes video.

11. The method of claim 1 in which the information describing video content includes text.

12. The method of claim 1 in which the user input comprises a selection of a channel.

13. The method of claim 1 in which the information describing video content is provided by an electronic program guide.

14. The method of claim 1 comprising accepting a choice by the user of displaying, on the primary video device, the video content available for viewing.

15. The method of claim 1 comprising generating a tag representative of the information represented by the graphical element.

16. The method of claim 15 in which the tag is generated by capturing a time and a channel of video content.

17. The method of claim 15 in which the tag is generated by sending a query from the handheld wireless device to a server in response to user input.

18. The method of claim 17 in which information or functions corresponding to the query are received from the server and stored in the handheld wireless device for use in interacting with the user.

19. The method of claim 15 in which the tag is generated by a server in response to a query from the handheld wireless device.

20. The method of claim 1 in which the information describing video content comprises a promotion.

21. The method of claim 20 in which the promotion is user-targeted.

22. The method of claim 1 in which the information describing video content comprises an advertisement.

23. The method of claim 22 in which the advertisement is user-targeted.

24. The method of claim 22 in which the information comprises an advertisement for video content.

25. The method of claim 24 comprising displaying video content represented by the advertisement.

26. The method of claim 24 in which the advertisement for video content is a television advertisement.

27. The method of claim 1 comprising sending, to another user, a reference to the information.

28. The method of claim 1 comprising sending, to another mobile device, a reference to the information.

29. The method of claim 1 comprising sending, to a computer, a reference to the information.

30. The method of claim 1 comprising sending, to a video device, a reference to the information.

31. The method of claim 1 comprising storing a reference to the information.

32. The method of claim 1 in which the information is displayed in a first portion of a display of the handheld wireless device.

33. The method of claim 32 in which the graphical element is displayed in a second portion of the display of the handheld wireless device.

34. The method of claim 1 in which the graphical element is an icon.

35. The method of claim 1 in which the graphical element is received through the second communication channel.

36. A method comprising:
while primary video content is being presented through a primary communication channel on a video device,
on a handheld wireless device, displaying a graphical element representing interactivity material matched with the primary video content, the interactivity material capable of being received through a second communication channel, the second communication channel separate from the first communication channel, the graphical element received as part of a mobile feed delivered to the handheld wireless device at least partly wirelessly from a remote server, the interactivity material delivered in response to an identification of the primary video content generated and sent to the remote server by the handheld wireless device, the identification not based on information received from the video device, the mobile feed synchronized with the primary video content so as to change automatically to correspond as the primary video content is presented on the video device;
in response to a change in the primary video content, automatically, and absent user input, receiving through the second communication channel information usable to access second interactivity material matched with the primary video content; and
displaying a second graphical element representing the second interactivity material.

37. The method of claim 36 in which the interactivity material is received from another user.

38. The method of claim 36 in which the interactivity material is an advertisement.

39. The method of claim 38 in which the advertisement is user-targeted.

40. The method of claim 36 in which the interactivity material involves an e-commerce opportunity.

41. The method of claim 36 in which the interactivity material is a promotion.

42. The method of claim 41 in which the promotion is user-targeted.

43. The method of claim 36 in which the user input comprises an invocation of the graphical element.

44. The method of claim 36 in which the user input comprises a voice command.

45. The method of claim 36 in which the user input comprises keyboard input.

46. The method of claim 36 in which the user input comprises microphone input.

47. The method of claim 36 comprising, in response to user input, storing a reference to the interactivity material.

48. The method of claim 36 comprising, in response to user input, retrieving a stored reference to the interactivity material.

49. The method of claim 36 comprising, in response to user input, sending a reference to the interactivity material to another user.

50. The method of claim 36 comprising, in response to user input, sending a reference to the interactivity material to another device.

51. The method of claim 36 comprising, in response to user input, sending a reference to the interactivity material to a web site.

52. The method of claim 36 comprising receiving the interactivity material from another user.

53. The method of claim 36 in which the interactivity material comprises an image.

54. The method of claim 36 in which the interactivity material comprises video.

55. The method of claim 36 in which the interactivity material comprises text.

56. The method of claim 36 in which the interactivity material comprises an embedded link.

57. The method of claim 36 in which the interactivity material is displayed in a first portion of a display of the handheld wireless device.

58. The method of claim 36 in which the graphical element is displayed in a second portion of the display of the handheld wireless device.

59. The method of claim 36 in which the graphical element is an icon.

60. A method comprising:
at a mobile device separate from a video device that is presenting first primary video content received over a first communication channel, communicating, to a remote server separate from the source of the first primary video content, an identification of the first primary video content, the identification not based on information received from the video device,
automatically receiving from the server with the mobile device, in response to the identification communicated to the server, a mobile feed of first secondary content related to the first primary video content, the mobile feed received at least partly wirelessly over a second communication channel, the second communication channel separate from the first communication channel over which the primary video is received by the video device, the mobile feed synchronized with the first primary video content so as to change automatically to correspond as the primary video content is presented on the video device
displaying the first secondary content related to the first video content, based on a selection by a user of the mobile device of second primary video content different from the first primary video content,
directing the video device to present the second primary video content and communicating an identification of the second primary video content to the server, and
automatically receiving, from the server, and displaying second secondary content related to the second primary video content.

61. The method of claim 60 comprising, at the mobile device, while displaying the second secondary content, displaying an icon corresponding to the first secondary content.

62. The method of claim 60 comprising, at the mobile device, in response to a user input, displaying the first secondary content and displaying an icon corresponding to the second secondary content.

63. The method of claim 60 comprising, at the mobile device, generating an indication of user interest in the first secondary content or the second secondary content, and receiving from the server information usable to access interactivity material related to the primary video content corresponding to the indicated secondary content.

64. The method of claim 63 comprising, at the mobile device, receiving the interactivity material.

65. The method of claim 63 comprising, at the mobile device, in response to user input, displaying the interactivity material.

66. The method of claim 65 comprising, at the mobile device, while displaying the interactivity material, displaying icons corresponding to one or more of the first or second primary video content or the first or second secondary content.

67. The method of claim 60 in which the secondary content comprises an electronic programming guide.

68. The method of claim 60 in which the secondary content comprises a program schedule.

69. The method of claim 60 in which the secondary content is used to set the mobile device to record future video content.

70. The method of claim 60 in which the secondary content relates directly or indirectly to what is being shown on a television program.

71. The method of claim 70 in which the secondary content that relates to what is being shown on a television program comprises video content.

72. The method of claim 60 in which the secondary content comprises ancillary information to complement the video content.

73. The method of claim 60 in which the secondary content comprises an advertisement.

74. The method of claim 60 in which the secondary content comprises a targeted promotion.

75. The method of claim 60 in which the secondary content allows a user to purchase goods.

76. The method of claim 75 in which the goods are associated with the primary video content.

77. The method of claim 60 in which the secondary content is based on a user profile.

78. The method of claim 60 in which the secondary content comprises content available on a web page on the Internet.

79. An apparatus comprising:
a mobile device having a first display screen and configured to:
communicate, to a remote server separate from a second display screen on a video device, an identification of first primary video content being presented on the second display screen of the video device, the first primary video content received over a first communication channel, the identification not based on information received from the video device,
automatically receive from the server with the mobile device a mobile feed of first secondary content related to the first primary video content, the mobile feed received at least partly wirelessly over a second communication channel, the second communication channel separate from the first communication channel over which the primary video is received by the video device, the mobile feed synchronized with the first primary video content so as to change automatically to correspond as the primary video content is presented on the video device,
based on a selection by a user of the mobile device of second primary video content different from the first primary video content, direct the second display screen to present the second primary video content and communicate an identification of the second primary video content to the server, and
automatically receive, from the server, and display on the first display screen second secondary content related to the second primary video content.

80. An apparatus comprising:
a handheld wireless device configured to:
while primary video content is being presented through a first communication channel on a primary video device, display information describing video content available for viewing on the primary video device, the information delivered as a mobile feed to the handheld wireless device at least partly wirelessly through a second communication channel, the information delivered in response to an identification of the video content generated and sent to a remote server by the handheld wireless device, the identification not based on information received from the primary device, the mobile feed including interactive material that is related to the primary video content, the mobile feed synchronized with the primary video content so as to change automatically to correspond as the primary video content is presented on the primary video device, the second communication channel separate from the first communication channel; and subsequent to user input in response to the displayed information, display and store a graphical element representing the information for later retrieval.

81. An apparatus comprising:
a handheld wireless device configured to:
while primary video content is being presented through a primary communication channel on a video device, display a graphical element representing interactivity material matched with the primary video content, the interactivity material capable of being received through a second communication channel, the second communication channel separate from the first communication channel, the graphical element received as part of a mobile feed delivered to the handheld wireless device at least partly wirelessly from a remote server, the interactivity material delivered in response to an identification of the primary video content generated and sent to the remote sever by the handheld wireless device, the identification not based on information received from the video device, the mobile feed synchronized with the primary video content so as to change automatically to correspond as the primary video content is presented on the video device;
in response to a change in the primary video content, automatically, and absent user input, receive through the second communication channel information usable to access second interactivity material matched with the primary video content; and
display a second graphical element representing the second interactivity material.

* * * * *